United States Patent [19]

Olson et al.

[11] 4,062,922
[45] Dec. 13, 1977

[54] PROCESS FOR PREPARING STRONTIUM FERRITES

[75] Inventors: Eugene E. Olson; Ronald Lee Clendenen; Charles McCammon Schlaudt, all of Houston, Tex.

[73] Assignee: Shell Oil Company, Houston, Tex.

[21] Appl. No.: 660,600

[22] Filed: Feb. 23, 1976

Related U.S. Application Data

[63] Continuation-in-part of Ser. No. 390,624, Aug. 22, 1973, which is a continuation of Ser. No. 183,838, Sept. 27, 1971, abandoned.

[51] Int. Cl.² .................................... C04B 33/32
[52] U.S. Cl. ........................ 264/294; 252/62.63; 264/322; 264/332; 264/DIG. 58
[58] Field of Search ............... 264/61, DIG. 58, 332, 264/320, 294; 252/62.63

[56] References Cited

U.S. PATENT DOCUMENTS

| | | | |
|---|---|---|---|
| 3,602,986 | 9/1971 | Conwicke | 264/61 |
| 3,723,587 | 3/1973 | Iwase | 264/61 |

OTHER PUBLICATIONS

Hoag, "Magnetic-Crystallographic Orientation Produced in Ferrites by Hot Working", AVSSD-0047-69-CR, AVSD-0128-70-CR, AND AVSD-0248-71-CR.

*Primary Examiner*—Robert F. White
*Assistant Examiner*—John Parrish

[57] ABSTRACT

Oriented strontium ferrites which yield superior ceramic permanent magnets are produced by the four-step process of a. preparing small particles of agglomerated less than 0.1 micron grains of ferric oxide and strontium oxide, b. maintaining the particles of agglomerated oxides at tempertures of from about 800° C to 1100° C for up to about 24 hours to cause the oxides to react (ferritize) and form less than 0.5 micron diameter crystallites of strontium ferrite, c. sintering the crystallites into a solid body either by maintaining them at from 1100° C to 1300° C for not more than two hours, or preferably by maintaining them at from 800° C to 1300° C while applying pressure, and d. hot forging the body by applying pressures of up to about 30,000 psi at temperatures of from 800° C to 1300° C.

9 Claims, 1 Drawing Figure

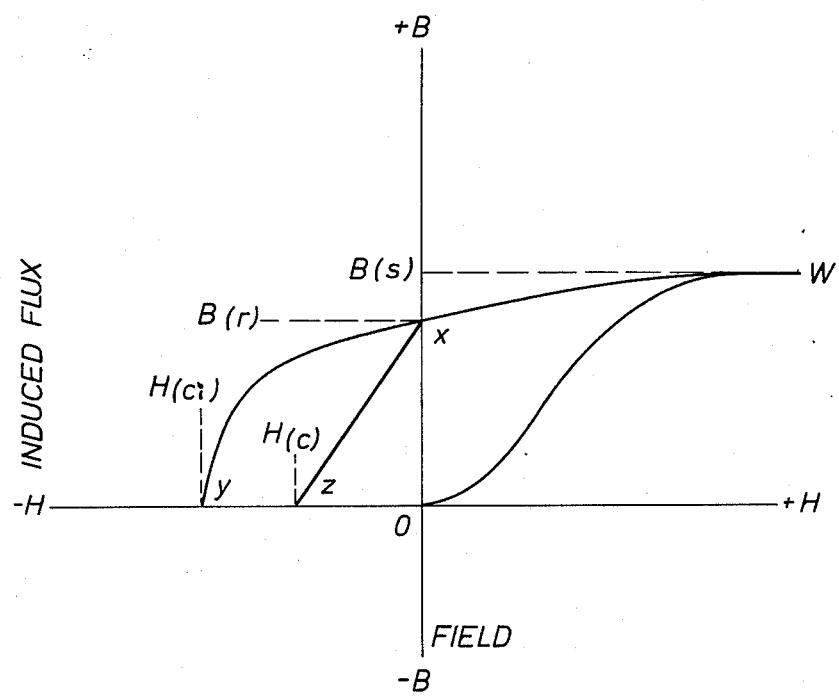

PROCESS FOR PREPARING STRONTIUM FERRITES

This application is a continuation-in-part of application Ser. No. 390,624, filed Aug. 22, 1973, which was a continuation application of Ser. No. 183,838, filed Sept. 27, 1971, now abandoned.

BACKGROUND OF THE INVENTION

1. Field of the Invention

This invention relates to the production of highly oriented strontium ferrites which form excellent ceramic permanent magents.

2. The Prior Art

The strontium ferrites produced by the instant process are described in U.S. Pat. No. 3,884,823, issued May 20, 1975, on application Ser. No. 183,896, filed Sept. 27, 1971.

Metal ferrites having a formula $MO \cdot nFe_2O_3$ wherein M is barium or strontium and $n$ has a value of about 6, are known to yield permanent magnets.

Conventionally ferrite magnets are prepared by an involved multi-step process. First, the two individual metal oxides are calcined and reacted together to form a solid ferrite body. The resulting ferrite body is then ground up and ball milled into a fine powder. This powder is slurried in liquid and the slurry is placed in a magnetic field which orients the individual ferrite particles. While still aligned in the magnetic field, the slurry of particles is wet-pressed to form a compacted solid of oriented particles. This solid is dried and then thoroughly sintered. Finally it is magnetized to give the final ceramic magnet product. This process has several disadvantages. In addition to being complicated, it also does not produce magnets having optimum magnetic properties (remanences and coercive forces), since it does not produce a fully oriented material made up of uniform small crystallites.

Both a desirable small particle size and a full orientation cannot be achieved using conventional techniques for two reasons: (1) orientation during wet-pressing requires large (2 micron or larger) particles to be fully effective, thus either orientation or particle size with their associated magnetic properties must be sacrificed; and (2) it is impossible to both restrain grain growth during sintering and achieve desired high densities.

It has recently been proposed to effect crystallite orientation by hot working a conventionally prepared solid ferrite. In "Magnetic-Crystallographic Orientation Produced in Ferrites by Hot Working", R. M. Haag, Annual Report Mar. 15, 1968 - Mar. 14, 1969, concerning Office of Naval Research Contract N00014-68--C-0364, issued on Mar. 14, 1969, the hot forging of barium ferrites only is disclosed. This report discloses the well-known ball milling technique to produce powders, but fails to note any other methods such as chemical precipitation to produce sub-micron particles. Also, this report is silent as to magnetic properties of the resulting barium ferrites and suggests that further work should be conducted.

Another report, "Magnetic-Crystallographic Orientation Produced in Ferrites by Hot Working", R. M. Haag, issued on Mar. 14, 1970, covering work on the above-noted contract from Mar. 15, 1969 to Mar. 14, 1970. This report, like the previous report discloses the use of wet ball milling techniques and is essentially silent regarding the magnetic properties, grain size or orientation of the resulting ferrites.

In a third, and concluding report of the same title and author, issued Mar. 14, 1971, covering work on Office of Naval Research Contract N00014-70-C-0278, from May 5, 1970 to Mar. 14, 1971, strontium ferrites are mentioned. However, the use of wet ball milling techniques are used and the magnetic properties, particularly the balance of magnetic properties of the resulting strontium ferrites are still too low.

The process of the present invention, while somewhat more complicated than known heat/pressure orientation processes, produces a product which forms finite ceramic magnets that are superior in overall magnetic characteristics to conventionally prepared ceramic magnets such as those prepared by the above-noted "Haag" process.

STATEMENT OF THE INVENTION

It has now been found that strontium ferrite ceramic permanent magents having both small uniform grain size and full crystallographic orientation and thus both high coercive forces and remanences are prepared by a hot forging process when this process is carried out under certain controlled conditions. The overall process comprises the steps of:

a. preparing small solid particles which themselves comprise an intimate mixture of agglomerated less than 0.1 micron diameter grains of ferric oxide and strontium oxide;

b. maintaining the particles of agglomerated oxides at temperatures of from 800° C to 1100° C for up to about 24 hours to effect at least a partial chemical reaction between the mixed metal oxides (ferritization) to form less than 0.5 micron diameter crystallites of strontium ferrite;

c. sintering the at least partially ferritized particles into a solid body either by maintaining them at 1100° C to 1300° C for not more than 2 hours at ambient pressure or preferably by maintaining them at 800° C to 1300° C while applying a pressure of up to about 30,000 psig; and d. heating and pressing (hot forging) the resulting sintered body at 800° C to 1300° C and 1000 psi to essentially completely densify it, if necessary to completely ferritize it, and to deform it and thus align its magnetic crystallites.

The products of this invention may then be magnetized by conventional means to give permanent magnets.

Magnets produced by this process are characterized as having better combined magnetic properties, that is higher remanences and coercive forces, than possible in ferrite magnets produced heretofore.

DEFINITION OF TERMS

As this invention is directed to a process for preparing strontium ferrite magnets having improved properties, for the sake of completeness it is desirable at this point to set out precisely what these properties are and their importance. This will be done with reference to the drawing which is a graphic representation of the amount of magnetic flux induced in a permanent magnet material when it is exposed to a varying magnetizing-demagnetizing field. It is in the form of two quadrants of an intrinsic hysteresis loop. The drawing also contains a portion of the normal hysteresis loop for the same material.

A sample of unmagnetized material by definition has no induced flux at 0 field and thus is at point 0 in the drawing. As an increasing magnetizing external field (+H) is applied, the flux induced in the sample follows line OW and reaches a constant value referred to as the saturation magnetization ($B_s$). As the positive field is reduced; the flux follows the line WX. The flux remaining when the field has been reduced to zero is termed the remanence ($B_r$). As an increasing demagnetizing external field is applied (−H), the induced flux follows the line XY. The demagnetizing field required to decrease the induced flux to zero is referred to as the intrinsic coercive force ($H_{ci}$) of the material. Alternatively, as the demagnetizing field is increased the normal induced flux will decrease to zero along line XZ. The point at which the normal induction reaches zero is termed the normal coercive force ($H_c$).

As can thus be seen, the resistance to demagnetization which a material possesses is indicated by the intrinsic coercive force, $H_{ci}$. The strength of a magnet is given in part by the value of the remanence. The product of induction and external field as given by the normal demagnetization curve (line XZ) reaches a maximum at some B and H. This value of this product is used as a figure of merit for permanent magnet materials and is referred to as $BH_{max}$ or the energy product. It may be seen from the shape of the curve in the drawing that the remanence must be equal to or less than the saturation magnetization. The intrinsic coercive force must be greater than or equal to the normal coercive force. It may also be seen that the normal coercive force cannot be larger than the remanence or else the intrinsic induction would increase even though a demagnetizing external field is being applied — a physical impossibility.

These magnetic properties can be related to the chemical and physical properties of the permanent magnet material. The individual metal oxides of the present magnets, ferric oxide and strontium oxide, do not alone form permanent magnets. They do, however, react to form ferrites having the formula MO·$n$Fe$_2$O$_3$ wherein M is strontium and $n$ is about 6. These compounds are capable of forming permanent magnets. In general terms the saturation magnetization is proportional to the extent of reaction (ferritization) between the oxides.

A ferrite is made up of a plurality of MO·6Fe$_2$O$_3$ crystallites. The magnetic properties of a ferrite are related to the orientation of these crystallites and their size. Each crystallite has an axis of easy magnetization. An ideal individual crystallite when subjected to a magnetic field parallel to this axis exhibits a remanence equivalent to its saturation magnetization. If all the crystallites in an ideal ferrite were prefectly oriented crystallographically their axes of easy magnetization would all be parallel. Such a ferrite would also have a remanence ($B_r$) along this axis equivalent to its saturation magnetization ($B_s$). The ratio $R_r/B_s$ is one simple measure of the extent of orientation of a ferrite material. A conventional ferrite, without special treatment, has an essentially random crystallite arrangement.

In an ideal ferrite permanent magnet, the crystallites would be uniformly about equal to the size of a magnetic domain, that is, 0.1 to 1 micron. Such a ferrite would have a very high intrinsic coercive force.

DETAILED DESCRIPTION OF THE INVENTION

The Particle Preparation Step

In the first step of this process small solid particles are prepared which comprise a major proportion of ferric oxide and a minor proportion of strontium oxide. More particularly, these particles contain from about 3 to about 6.5 moles of ferric oxide per mole of strontium oxide. Preferably they contain from about 4.5 to about 6.5 moles of ferric oxide per mole of strontium oxide, and most preferably from about 5.0 to about 6.5 moles of ferric oxide per mole of strontium oxide. The particles may, if desired, in addition contain minor amounts, for example up to about ten percent by weight of additives known to be used advantageously in strontium ferrite magnets, such as BaO, Bi$_2$O$_3$, Al$_2$O$_3$, ZrO$_2$, B$_2$O$_3$, CaF$_2$, SiO$_2$, SrSO$_4$, PbO and CaSO$_4$.

The particles formed in this step are themselves agglomerates of particles of the two or more metal oxides and additives. With any of these compositions, it is very desirable that these agglomerates be small and it is essential that the particles which make up the agglomerates by very small in size. The agglomerates must be made up of particles of ferric oxide and oxide which are less than 0.1 microns in diameter. Excellent results are obtained when the individual oxide particles which make up the agglomerates are less than 0.02 microns in diameter, which is about the smallest size which can be readily measured by present techniques.

Suitable agglomerated particles may be produced by several techniques. In one method, for example, they are prepared by coprecipitating a mixture of decomposable compounds of the metals and then thermally decomposing the precipitate. Other techniques include, for example, spray drying, or spray roasting a mixed salt solution. These methods all lead to very intimately mixed agglomerates of less then 0.1 micron particles of ferric oxide and divalent metal oxides.

Using the coprecipitation technique, a solution, most conveniently in water, of soluble ferric and strontium salts (and optionally additives) is first prepared. Examples of suitable salts include ferric chloride, nitrate, acetate, chlorate, formate and oxalate; strontium nitrate, chloride, and acetate. Soluble organic complexes may also be employed. The solution of salts is then treated with a precipitating agent which gives a thermally decomposable precipitate. Examples of suitable precipitating agents are hydroxyl ion, carbonate ion, and the like. Preferred precipitating agents are hydroxide ion and carbonate ion in amount of from about one to about ten times the stoichiometric amount required for precipitation of all the metal ions present.

The amount of soluble metal salts present in the aqueous solution is determined by considering the solubilities of the precipitates to ultimately give the desired ferric oxide to divalent metal oxide molar ratio of about six to one.

The mixed precipitate is separated, rinsed and thermally decomposed in an oxygen-containing atmosphere to give the mixed oxide particles. Generally, an exposure of from about 2 to 36 hours to temperatures in the range of from about 500° C to about 750° C is adequate to carry out the decomposition. Somewhat longer times and higher temperatures may be required with very difficultly decomposed salts; however, long heatings at temperatures of greater than above about 750° C should be avoided.

Using the spray-drying technique, a solution is prepared containing a decomposable ferric salt and one or more decomposable salts of strontium, in the desired about 3:1 to 6.5:1 molar ratio. Suitable salts include nitrites, carbonates, acetates, chlorides and like materials which decompose when heated in the presence of oxygen. Any additives should also be present in this solution to ensure their ultimate intimate admixture with the principal metal oxides. This solution is atomized into a chamber maintained at an inlet drying temperature in the range of from about 100° C to about 600° C, preferably from about 200° C to 500° C, to form small, dry particles of mixed decomposable salt. These particles are then thermally decomposed in an oxygen-containing atmosphere. This decomposition step is similar to that described with the coprecipitation method of forming particles and requires similar conditions.

Using the spray-roasting technique, a solution of decomposable salts is prepared and atomized into a chamber or fluidized bed having an oxygen-containing atmosphere heated to a temperature in the range of from 500° C to 1200° C. In one step the particles of mixed decomposable salts are formed and thermally decomposed to mixed oxides.

The Chemical Reaction Step

The particulate solid agglomerates produced in the first step contain essentially distinct grains of ferric oxide, distinct grains of strontium oxide (and optionally additives). In this step of the process, the particulate agglomerates are heated to a relatively low temperature for a relatively long period to cause these separate oxide grains to chemically react and form small crystallites of their respective metal ferrite from which the final ceramic magnets are made. This heating step is known as ferritizing. These ferrite products can be represented by the formula $MO \cdot nFe_2O_3$ where M is strontium and $n$ has a value of from 3 to 6.5. The crystallites of ferrite produced in this step must on the average be less than 0.5 microns in diameter. The crystallites are uniform in size, preferably having an average diameter of not greater than 0.2 micron with not more than 10% of the crystallites having diameters above 0.5 microns.

It is essential that the temperature and period of the heating of this step be closely controlled. The temperature must be maintained high enough to cause the metal oxides to react with one another and form the desired ferrite crystallites. The temperature must not be substantially above the reaction temperature or else undesired amounts of particle grain growth will occur. It is not necessary that this ferritization be carried to completion. It is very difficult to achieve complete reaction between the oxides without also obtaining some grain growth. It has been found that if ferritization is only partially completed in this step, it can be completed by the heat and pressure employed in the final two steps. When pressure is applied with heat in the forming and forging steps full ferritization is effected at lower temperatures, and thus with far less chance of undesired grain growth. It is preferred to obtain ferritization partially by heating in this step and partially by heating with pressure in the final two steps (forming and forging). Temperatures selected in the range of from 800° C to 1100° C are suitable for full or partial ferritization as are heating periods of from about 0.1 hour to about 24 hours with times of from 0.5 to 12 hours and temperatures of from 950° C to 1100° C being preferred.

The times and temperatures for ferritization are critical and depend upon each other and upon the chemical make-up of the oxide mixture. The time ranges and temperature ranges given here, and also given below for the sintering and forging steps are not intended to be mutually extensive, but rather to be related. The lower temperatures given will typically required the longer times given, while the highest temperatures will give best results with the shorter times. The other extremes, for example longest times in combination with highest temperatures, will generally be less suitable. Examples of typical preferred conditions include, heating for from 4 to 12 hours at 950° C, for from 2 to 8 hours at 1000° C, for from 2 to 4 hours at 1050° C or from 0.5 to 2.0 hours at 1100° C. This heating can be carried out in an oxygen-containing atmosphere, very suitable in air. The products of this heating step are the desired fine powders of ferrite crystallites having an average diameter of less than 0.5 microns, sometimes loosely bonded together.

The Sintering Step

The metal ferrite powder next is formed into a compact solid mass. This forming is effected either by the application of heat (sintering) or preferably by the application of heat and pressure. This step is required since an essentially solid body must be employed in the hot forging step which follows to prepare the actual magnetizable oriented ceramic material.

In this sintering step the emphasis is on a relatively quick heating of the powder, since the temperatures employed for sintering also promote undesired grain growth. A quick heating permits sintering while minimizing grain growth. Long heatings at relatively low temperatures might be used but pose the hazard of grain growth. Generally up to about 2 hours at 1100° C to 1300° C gives a good sintered product. More specifically, 0.1 to 2.0 hours at 1100° C to 1250° C are preferred for sintering the strontium ferrite, crystallites. Examples of preferred time/temperature sintering combinations are, 1 to 2 hours at 1100° C, 0.5 to 1.5 hours at 1150° C, and 0.25 to 1 hour at 1200° C.

In a preferred method of operation, heat and pressure are both employed to effect compaction and sintering. That is, the powder is hot pressed in a die. The use of pressure permits lower temperatures and/or shorter times to be employed and thus further limits grain growth. Very suitable hot pressing conditions are from 800° C to 1300° C and from 1000 psi to 30,000 psi. Use of conditions in this range enable suitable compaction to be effected in a total heating cycle of about 10 minutes or less, generally in from 1 to 10 minutes. Best results are obtained when from 900° C to 1200° C and from 3000 psi to 10,000 psi are used to form the compact.

Examples of suitable times, temperatures and pressures to effect pressure sintering are 10 minutes at 950° C and 15,000 psi, 10 minutes at 1050° C and 5000 psi, 3 minutes at 1050° C and 20,000 psi, and 1.2 minutes at 1200° C and 5000 psi.

The sintering or hot-pressing may be carried out in an oxygen-containing environment (air) in an inert environment (nitrogen) or in a vacuum.

The nature of the product of the sintering (or preferably hot pressing) is critical to the success of this process. To ultimately yield the desired high quality magnets, it is essential that the product of this step be made up of uniform, less than 1 micron diameter crystallites. When heat and pressure are applied in this step the products are more particularly characterized as being solids, having densities of from 80 to 100% of the theoretical maximum. When heat alone is applied the products are solids of lower density, generally 40 to 80% of the theoretical maximum. These materials must have this lower density because more severe heatings necessary to achieve higher densities also give undesired amounts of grain growth. In this case, full density in addition to crystallite orientation is achieved in the following hot forging step. In both cases the solid products are made up of crystallites having an average diameter preferably less than 0.7 micron, especially form 0.3 to 0.7 micron, and having not more than 10% of their diameters greater than 1 micron. When such a product is oriented and if necessary densified in the hot forging step a superior magnet results. Without further treatment, this product might be useful in low quality crude magnet applications but would not be suitable as a desirable high quality magnet.

The Hot Forging Step

The uniformly fine grained solide ferrite body formed in the sintering step of this process has the property of being ductile when heated to a temperature approximating its forming temperature. This property is utilized in this step when the body is hot forged to effect full densification and the orientation of ferrite grains essential to the production of an anisotropic permanent magnet. The hot forging is carried out by heating the ferrite body and applying a pressure to it in a manner which deforms it. As in the sintering step, the emphasis is on a rapid treatment with a limited exposure to high temperatures to minimize grain growth. Conditions similar to the hot pressing conditions optionally used to form the solid ferrite body may be used for hot forging. Temperatures of from 800° C to 1300° C, preferably 850° C to 1150° C and pressures of from 1000 psi to 30,000 psi, preferably 3000 psi to 20,000 psi, are useful, with 900° C to 1100° C and 3000 psi to 10,000 psi being most preferred hot forging conditions. The atmosphere employed during forging is not critical; air, an inert gas such as nitrogen or vacuum may be used.

The temperature and pressure are most favorably controlled to give a strain rate of from about 1%/min. to about 500%/min. The preferred temperature and pressure conditions noted above fall into this area.

As in the sintering step, it is desirable to make the heating rapid. Preferably the forging period is not more than about 0.5 hours, with times of 0.2 hours or less being preferred, and forging times of from 0.1 minutes to 5 minutes being most preferred.

The amount of forging, that is the amount of deformation, should be controlled. A measure of the deformation is expressed by the ratio $$(L - L_o)/L_o$$

wherein L is the size of the body along the forging axis after forging, and $L_o$ is the size before forging. To achieve the same degree at orientation, non-dense bodies will require different degrees of forging than dense bodies since, in the former, a certain amount of forging will be taken up in the densification process. After the material has been forged to essentially theoretical density, additional forging will produced bulk flow of the material resulting in orientation. The deformation of a body by forging can be approximated by the equation $$(L - L_o)/L_o = (p_r - 1) + [(L - _oL_o)/(p_rL_o)]$$

wherein $p_r$ is the density relative to theoretical. The first term in parentheses represents the contribution of densification to forging, and the second term represents the contribution of mass flow. For any given density, the most suitable values for forging, represented by $$(L - p_oL_o)/p_rL_o$$

will range from 0.1 to 0.9 with values between 0.5 and 0.7 being preferred.

This hot forging of these ductile bodies is not limited by the apparatus employed. It may be carried out in a press, with rollers, or with other means which will enable these ferrite bodies, when heated to a relatively ductile state, to be deformed. This deformation orients the crystal structure of the ferrite such that the axes of easy magnetization of the crystallites are all aligned. When the resulting ferrite, having an aligned structure, is magnetized in a field having the same orientation as the alignment of the axes of easy magnetization a strong permanent magnet is formed.

The product of the hot forging step can if desired be shaped and ground to give useful configurations.

This process has been described as four separate batch-type steps. In some applications it might be of advantage to carry out several of these steps continuously. For example, the heating of the particle forming and the ferritization heating could easily be carried out on a moving belt which passes through two different heating zones. Similarly, the ferritization and sintering steps could be accomplished in two heating zones traversed by a moving oxide mass.

The Metal Ferrite Product

The metal ferrite product of this invention has a formula MO·$n$Fe$_2$O$_3$ wherein M is strontium and $n$ has a value of from 3 to 6.5, preferably 5 to 6.5 inclusive. The ferrites may contain minor amounts of added other materials, if desired.

The ferrite products are dense and finely grained, and have high degrees of crystallite orientation. The densities of these ferrites are at least 95%, preferably at least 97%, and most preferably at least 98% of the theoretical maximum. The average crystallite size of these ferrites is less than 2.5 microns, preferably in the range of from 0.5 to 1.5 microns. The crystallites are uniform with not more than 10% having diameters of greater than 2.5 microns. The crystallites of these materials are highly oriented. Suitably the crystallites are at least 90% oriented (that is, having a $B_r/B_s \geq 0.9$), with orientations of not less than 95% being preferred. As pointed out above, this combination of full orientation and samll grain size has not been obtained using conventional ferrite-forming processes.

Because of this unique structure, that is a fine grain structure and a high degree of crystallite orientation, these magnets make ceramic magnets which have both high remanences and coercive forces. Ferrite magnets made with this invention uniformly have remanences of greater than 3600 gauss and normal coercive forces of greater than 3600 oersteds.

Ceramic magnets of this quality would find application in a variety of areas, for example in electric motors, in loudspeakers, and in holding applications.

The process of this invention will be further described by the following examples and comparative experiments. These are presented for purposes of illustration and are not intended to limit the scope of this invention.

EXAMPLE I

PREPARATION OF SrO·5.4 Fe$_2$O$_3$ MAGNET BY CONSECUTIVELY HOT PRESSING AND FORGING IN VACUUM

A. Starting Material Preparation

4536 Grams of Fe(NO$_3$)$_3$·9 H$_2$O and 221.6 grams of Sr(NO$_3$)$_2$ were dissolved in 7 gallons of water. This solution was dried in a Niro brand portable spray drier. The spray drier inlet temperature was 435° C and exit temperature was 160° C. The material from the spray drier was placed in ceramic crucibles and heated in air to 600° C for 15½ hours to remove residual nitrates. The powder product was examined by a scanning election microscope and found to consist of particles made up of intimately mixed less than 0.02 micron diameter grains of iron oxide and strontium oxide.

B. Ferritization

To ferritize the material, the crucibles containing the powder were placed in a furnace at 1000° C for 4 hours in air. The calcined material was somewhat lumpy but was easily crushed to pass an 80 mesh sieve.

C and D. Hot Pressing and Hot Forging

The ferrite powder was loaded into a graphite die, and then heated to 1000° C in a graphite heating element furnace. A pressure of about 4000 psi was applied. The furnace atmosphere pressure varied from 35 microns to about 350 microns during the operation. The sample was held at 1000° C for about 10 minutes to effect sintering. The sintered sample was pushed out at the hot pressing cavity in the die into a larger cavity where the sample was forged at 4000 psi and 1000° C for 5 minutes to give a deformation $(L - L_o)/L_o$ of about 60%. After forging, the sample was cooled in the die, removed and its properties were measured.

Its properties were as follows:
density = 4.92 gm/cc (96% of theoretical maximum)
$B_s$ = 3780 gauss
$B_r$ = 3700 gauss
$H_c$ = 3600 oersteds
$H_{ci}$ = 3820 oersteds
$BH_{max}$ = 3.3 × 10$^6$ gauss · oersteds Examination of this material by scanning electron microscope showed that it was composed of oriented crystallites having an average diameter of 1.0 microns of which less than 10% were larger than 2.0 microns.

EXAMPLE II

PREPARATION OF SrO·5.4 Fe$_2$O$_3$ MAGNET BY VACUUM HOT PRESSING AND AIR FORGING

A. Starting Material Preparation

4536 Grams of Fe(NO$_3$)3.9 H$_2$O and 221.6 grams of Sr(NO$_3$)$_2$ were dissolved in 7 gallons of water. This solution was dried in a Niro brand portable spray drier. The inlet temperature was 435° C and outlet temperature was 160° C. The material from the spray dried was placed in ceramic crucibles and heated in air to 600° C for 15½ hours to remove residual nitrates.

B. Ferritization

To ferritize the material, the crucibles containing the powder were placed in a furnace at 1000° C for 4 hours in air. The particles of calcined material lumped together somewhat but were easily crushed to pass an 80 mesh sieve.

C. Hot Pressing

The ferrite powder was loaded into a graphite die and then heated to 1000° C in a graphite heating element furnace. Applied pressure was about 4000 psi. Furnace vacuum ranged from 35 to about 350 microns during the hot pressing operation. The sample was held at temperature for about 15 minutes to effect sintering. The sample was cooled in the furnace, removed, and cored into smaller specimens which were later to be hot forged. Property measurements on the hot pressed sample gave the following results:

density = 4.77 gm/cc
$B_s$ = 3000 gauss
$B_r$ = 2400 gauss
$H_c$ = 2150 oersteds
$H_{ci}$ = 4920 oersteds This product was a solid and had an average grain size of about 0.5 microns. At least 80% of the grains were of diameters of from ¼ to ¾ micron. Not more than 10% of the grains were above ¾ of a micron in diameter.

D. Hot Forging

Samples cored from the hot pressed material were forged to different degrees. Strain rates on all of the forgings were kept constant at 10%/minute and the forging temperature was 1100° C in air. The samples were placed in a cold furance, the furnace then being heated to the forging temperature in 9 minutes. The samples were allowed to equilibrate for 15 minutes at temperature; then sufficient load was applied to deform the specimens at the required rate. The samples were cooled in air, removed from the furnace and their properties were measured as follows:

| $\frac{L - L_o}{L_o}$, % | 47.5 | 58.5 | 69.0 | 72.0 |
|---|---|---|---|---|
| density, gm/cc | 4.84 | 4.85 | 4.86 | 4.87 |
| $B_s$, gauss | 3750 | 3880 | 3840 | 3720 |
| $B_r$, gauss | 3600 | 3800 | 3840 | 3680 |
| $H_c$, oersteds | 3400 | 3400 | 3280 | 2700 |
| $H_{ci}$, oersteds | 4040 | 3680 | 3640 | 3000 |
| $BH_{max}$, gauss-oersteds | 3.1 × 10$^6$ | 3.5 × 10$^6$ | 3.7 × 10$^6$ | 3.3 × 10$^6$ |
| average grain size, microns | ¾ | 1 | 1¼ | 1¼ |
| less than 10% larger than, microns | 1 | 1¼ | 1½ | 1¾ |

EXAMPLE III

This example illustrates the preparation of another strontium ferrite magnet.

909.2 Grams of Fe(NO$_3$)$_3$·9H$_2$O and 47.5 grams of Sr(NO$_3$)$_2$ were dissolved in 3 gallons of warm tap water. Then 4.1 grams of CaF$_2$ in 100 mls of water and 150 mls of concentrated HNO$_3$ were added. This solution was dried in a Niro brand portable spray drier. The spray inlet temperature was 420° C and the exit temperature was 160° C. The material from the spray drier was placed in ceramic crucibles and heated in air to 600° C for 15½ hours to remove residuals.

To ferritize the material, the crucibles containing the powder were placed in a rotary furnace at 800° C for 4 hours in oxygen.

The ferrite powder was then loaded in a Hastelloy die and heated to 950° C in a Nichrome element furnace. The applied pressure was about 8000 psi. The sintered sample was pushed out of the hot pressing cavity in the die into a larger cavity in the die where the sample was forged at 955° C at 8000 psi for four minutes to give a deformation $(L - L_o)/L_o$ of 40%. After forging, the sample was cooled in the die, removed and its properties were measured and are as follows:

density = 4.97 grams/cc
$B_s$ = 3900 gauss $H_{ci}$ = 4480 oersteds
$H_c$ = 3850 oersteds It is well-known that by conventional fabrication techniques the remanence and coercive forces for magnets are inter-related wherein an increase in remanence values causes a corresponding decrease in coercive force values, other factors being equal. The above data clearly shows that the present strontium ferrites exhibit both a high $B_s$ (3900 gauss) and a high $H_{ci}$ (4480 oersteds).

EXAMPLES IV – XV

A large number of strontium ferrites were prepared using essentially the four-step process described in Example III. The magnetic properties of a representative number of ferrites are tabulated in Table I.

TABLE I

| Experiment | $B_r$ (Gauss) | $iH_c$ (Oers.) | (BH) max $10^6$ Gauss Oers. | $B_rH_x$ $10^6$ Gauss Oers. | $B_r/B_s$ |
|---|---|---|---|---|---|
| IV | 4000 | 4520 | 3.9 | 17.6 | .97 |
| V | 3900 | 4480 | 3.6 | 16.9 | .96 |
| VI | 4010 | 4280 | 3.9 | 16.5 | .96 |
| VII | 4000 | 4100 | 4.0 | 16.1 | .96 |
| VIII | 4040 | 4000 | 4.0 | 15.6 | .99 |
| IX | 3900 | 4350 | 3.6 | 16.0 | .95 |
| X | 3950 | 4240 | 3.75 | 16.3 | .96 |
| XI | 4050 | 4240 | 3.9 | 16.0 | .96 |
| XII | 3800 | 4680 | 3.4 | 16.9 | .94 |
| XIII | 4100 | 3900 | 4.2 | 15.2 | .99 |
| XIV | 4000 | 4100 | 3.9 | 15.0 | .999 |
| XV | 4050 | 3940 | 4.1 | 15.5 | .99 |

The squareness factor is $B_r/B_s$. The data in Table I clearly illustrates that the instant strontium ferrite magnets have a squareness factor (degree of orientation) consistently in excess of 0.95. Perfect orientation is taken as 1.0.

For comparison, the magnetic properties of three strontium ferrites noted in Haag Report III noted in the Prior Art hereinbefore, in Table I at page 2 are as follows:

| Sample No. | 1488 | 1492 | 1494 |
|---|---|---|---|
| $B_r$ (gauss) | 3400 | 3000 | 3600 |
| $H_c$ (oersted) | 2750 | 2750 | 2600 |
| $(BH)_{max}$ ($10^6$ gauss (oersted) | 2.7 | 2.1 | 3.2 |

That based upon the above comparative data, the magnetic properties of the strontium ferrites produced by the instant four-step process are consistently higher than the ferrites disclosed by Haag Report III.

We claim as our invention:

1. The process for preparing a metal ferrite of the formula MO·$n$Fe$_2$O$_3$ wherein M is strontium and $n$ has a value of from 3 to 6.5, said ferrite having an average crystallite size of not greater than 2.5 microns, a normal coercive force of greater than about 3600 oersteds, a remanence of greater than about 3600 gauss and at least about 90% crystallite orientation, which comprises the steps of:
  a. preparing solid particles comprising intimate agglomerates of (i) less than 0.1 micron grains of strontium oxide and (ii) less than 0.1 micron grains of ferric oxide, having a molar ratio of ferric oxide to divalent metal oxide of from 3:1 to 6.5:1;
  b. maintaining the solid particles of agglomerated oxides at temperatures of from about 800° C to 1100° C for a period of from about 0.1 to about 24 hours, thereby forming less than 0.5 micron average diameter crystallites of divalent metal ferrite;
  c. sintering the crystallites from about 0.1 to about 2 hours at a temperature of form 800° C to 1300° C and from about 100 to 30,000 psi into a solid ductile body having a uniform average grain size of less than 1 micron; and
  d. hot forging the solid ductile body by applying a pressure of from 1000 psi to 30,000 psi and a temperature of from 800° C to 1300° C, said pressure and temperature being selected to give a strain rate of from about 1%/minute to about 500%/minute.

2. The process of claim 1 wherein, in step (b), the temperature employed is in the range of from 950° C to 1100° C and the time period for heating is from 0.5 to 12 hours.

3. The process of claim 2 wherein, in step (d), the temperature employed is in the range of 850° C to 1150° C, the pressure is from about 3000 psi to 20,000 psi and the time period for forging is from 0.1 minutes to 10 minutes.

4. The process of claim 1 wherein the sintering in step (d), is carried out in not more than 10 minutes while applying a pressure of from 1000 to 30,000 psi.

5. The process of claim 4 wherein, in step (b), the temperature employed is in the range of from 950° C to 1100° C and the time period for heating is from 0.5 to 12 hours.

6. The process of claim 5 wherein, in step (d), the temperature employed is in the range of 850° C to 1150° C, the pressure is from about 3000 psi to 20,000 psi and the time period for forging is from 0.1 minutes to 10 minutes.

7. The process of claim 6 wherein, in step (c), the sintering is carried out at a temperature of from 900° C to 1200° C and a pressure of from 3000 psi to 20,000 psi.

8. In a process for preparing a solid ferrite body having oriented crystallites suitable for forming anisotropic ceramic magnets wherein crystallite orientation is induced in the ferrite body by deforming the body with from 1000 to 30,000 psi pressure at a temperature in the range of from about 700° C to about 1300° C, the improvement which comprises hot forging a ductile ferrite body composed of ferrite grains, said grains having an average diameter of not greater than about 0.7 micron, with not more than 10% of said grains having diameters in the range of above about 1 micron.

9. The process of claim 8 wherein the ferrite body consists essentially of ferric oxide and strontium oxide in the molar ratio of from 5 to 6.5 moles of ferric oxide for each mole of strontium.

* * * * *